United States Patent

[11] 3,620,469

[72] Inventors Anton Riedel;
Max Nissl, both of Munich, Germany
[21] Appl. No. 57,199
[22] Filed July 22, 1970
[45] Patented Nov. 16, 1971
[73] Assignee AGFA-Gevaert Aktiengesellschaft
Leverkusen, Germany
[32] Priority Aug. 1, 1969
[33] Germany
[31] P 19 39 189.0

[54] DEVICE FOR ATTACHING A FLEXIBLE STRIP TO A REEL FOR WINDING THEREON

12 Claims, 5 Drawing Figs.

[52] U.S. Cl. 242/74
[51] Int. Cl. B65h 75/28
[50] Field of Search 242/74, 74.1, 74.2, 71.8, 71.8 A, 125, 125.1; 197/175

[56] References Cited
UNITED STATES PATENTS

| | | | |
|---|---|---|---|
| 2,204,928 | 6/1940 | Culver | 242/74 UX |
| 3,062,468 | 11/1962 | Braun | 242/74 |
| 3,195,828 | 7/1965 | Kuckhoff et al. | 242/74.1 |
| 3,523,654 | 8/1970 | Zielke | 242/74.1 |

*Primary Examiner*—Stanley N. Gilreath
*Assistant Examiner*—Milton Gerstein
*Attorney*—Connolly and Hutz

ABSTRACT: A device for attaching a flexible strip to a reel includes a wedge assembly and a dovetailed slot in the hub of the reel. The preliminary wedge assembly includes a central plug attached cornerwise to a pair of spaced wedges by frangible and flexible webs. Downward pressure of the assembly in the strip urges it into the slot and further downward pressure on the plug breaks the webs and forces the plug between the tapered wedges to urge them apart and lock them under the undercut corners of the slot. The flexible strip is thereby secured under the frictionally locked wedge assembly within the dovetailed slot. The preliminary wedge assembly is conveniently molded of a synthetic plastic material such as polyethylene.

DEVICE FOR ATTACHING A FLEXIBLE STRIP TO A REEL FOR WINDING THEREON

BACKGROUND OF THE INVENTION

This invention relates to a device for attaching a flexible strip, such as magnetic tape or photographic film to a reel, and more particularly relates to such a device in which the strip is secured by a wedge assembly engaged in a dovetailed slot in the peripheral surface of the hub of the reel and disposed parallel to its axis.

Reels with attached flexible strips are employed in many current areas of technology. Means for attaching the strips to the reels are for example required for magnetic tapes and photographic film strips which must securely lock the strips to the reels without utilizing glue which is subject to hardening. The manufacture and assembly of magnetic tape cassettes is a particularly important field in which the ends of the magnetic tape must be securely attached to the hub of the reel.

There are presently known reels with means for attaching the end of thin strip of magnetic tape to the hub within a recess having a cross section extending parallel the axis.

The cross section of the recess is determined by a pair of peripherally extending slots of different depth, providing an inverted T-shaped recess. The securing element has an omega-shaped cross section corresponding to the depth of the recess to permit the laterally extending lobes to be inserted and clamped into the undercut slots in the recess. One of the lobes of the omega-shaped securing element is made longer than the other to correspond to the varying depths of the peripherally undercut slots in the recess. After the tape is inserted in the recess, the securing element is positioned at a suitable angle and the longer lobe inserted into the deeper of the lateral slots. Then the attaching element is rotated completely into the slot about the axis of rotation formed by the inserted longer lobe while the shorter lobe is pressed toward the longer in response to the resultant bending deformation of the securing member. After the compressive force is released, the shorter lobe springs into the shorter slot when the securing element springs apart.

In another known construction of reel with attaching member apparently derived from the above-described structure, the securing element has its tip attached at the upper edge of the recess, whose axis of rotation replaces the aforementioned hingelike preliminary engagement of the omega-shaped securing element by virtue of the relatively great flexibility of the attaching element. It has a single lobe extending from the free end of the attaching element, which may be deformed toward the base of the recess to rotate it into and clamp it into the single undercut slot. This type of reel has the advantage of an attached securing element with the disadvantage of an attaching force which varies in accordance with the direction of turning and pull of the reel. This construction also does not permit the tape to pass completely under the securing element.

Both of the aforementioned types of reels with securing elements require a series of manipulations and applications of forces in different directions partially opposite to each other or curved in which the applications of the forces and their directions must be carefully synchronized. The applications of these forces and their directions may be performed manually with relative ease, particularly when only one strip must be attached to the reel. When however a great number of strips must be attached to reels, the aforementioned devices require an expenditure of time and effort which is not compatible with demands of economical mass production. A machine might be developed to perform the functions corresponding to the described manipulations. Such a machine would however be greatly complicated in structure, because of the various and partly overlapping applications of force and the different directions of movement of required grasping and pushing devices, that they would be relatively expensive to manufacture and operate to the extent that the manufacture and use of such an assembly machine would be economically prohibitive.

An object of this invention is to provide a device for attaching a flexible strip to a reel of the aforementioned type having a relatively simple and economical structure and which may be manipulated into a simple slot by application of a minimum of movements, as similar to each other as possible to attach the strip to a reel. Another object is to provide such a device which may be efficiently performed by a device simple in structure and operation, and thus economical. This device should also provide uniform retaining force for the strip in either direction of rotation, and permit the strip to pass continuously under the securing element.

SUMMARY

The aforementioned requirements are solved for a reel having a securing device for connecting strips of tape or the like thereto in which the tape is secured by insertion of the securing element in an undercut groove in the peripheral surface of the reel and extending parallel to the axis thereof—by utilizing a dovetailed slot and a wedge assembly for insertion therein to lock the tape under the undercut corners. The inserted wedge assembly includes a pair of tapered wedges spaced from each other with adjacent sides parallel and having a rectangular plug inserted between them in frictional engagement therewith to lock the outer surfaces of the tapered wedges under the undercut corners of the dovetailed slot. This structure allows the outer tapered wedges and the inner plug to be inserted in one direction of movement and to thus require an applying device which acts only in one direction. The aforementioned device also has the advantage that the securing element and the slot are symmetrical about their center lines. This simplifies the manufacture and assembly of device and also makes its resistance to the pull equal in both directions of rotation of the reel. It also satisfies the requirement of allowing the strip to pass completely under the securing element.

A particularly advantageous embodiment of a method of making such securing means and for utilizing it to attach a strip to a reel comprises the initial fabrication of the securing element in a unitary assembly by molding or the like, such as injection molding. In this manner a pair of adjacent corners of the spaced tapered wedges are attached to the adjacent corners of the central rectangular wedge by flexible and frangible webs. The adjacent sides of the tapered wedges incline toward each other from their connected to their free ends with their outer surfaces disposed substantially parallel to each other. This facilitates their insertion into the slot. When an inserting force is thereafter applied to the central plug in the same direction, the connecting webs are torn and the central plug is forced between the outer tapered wedges to push them outwardly under the undercut corners of the dovetailed slot, thus ultimately engaging the wedge assembly within the dovetailed slot. This permits the wedge assembly, despite the necessity for relative movement between its component parts, to be manufactured in a unitary assembly to thus facilitate and simplify storage in readiness for immediate use. The unitary structure of the preliminary securing assembly also makes it possible to align and store them in magazines by known means to facilitate loading into automatic apparatus for inserting the securing elements into the slots in the reels. This satisfies all of the prerequisites required to automatically insert and engage the locking elements in the slots by an automatic machine or apparatus. In this connection the preliminary wedge assembly may be inserted into the recess by a simple tool by an automatic device, such as a plunger, which first inserts the wedge assembly without altering its initial configuration, by a force exerted only upon the outer tapered wedges. After the outer tapered wedges are contacted with the base of the slot or a strip disposed therein, the central plug is forced in the same direction between the outer flanges (after the connecting webs are torn) to thus complete the engagement of the wedge assembly and attachment of the strip to the reel.

It is suggested further in accordance with this invention that the outer bottom surfaces of the tapered wedges, which are ultimately disposed toward the bottom of the slot, are preliminarily arranged in the preliminary wedge assembly substantially perpendicularly to their direction of insertion whereby they are caused to incline upwardly from the bottom of the slot in their final position. This provides a free space in the corners between the wedges and the undercut corners of the slot to minimize creasing and crimping action on the fold of tape or strip held therebetween. This avoidance of sharp corners prevents damage to the tape because it is loosely confined in a substantially free loop within the corners of the dovetailed slot. Operation of this device is facilitated by making the bottom outer corners of the wedges substantially right angular and their inner bottom corners acute angular to facilitate insertion and locking in the dovetailed slot. The top outside corners of the tapered wedges are obtuse angular to provide a substantially smooth continuation of the hub when inserted in the slot. The operation of the device is further facilitated by making the distance across the tops of the tapered wedges substantially equal to the opening of the slot and the sum of the assembled widths of the bottoms of the tapered wedges and the adjacent side of the plug substantially equal to the width of the base of the slot.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which.

DESCRIPTION OF THE PREFERRED EMBODIMENT.

Figure 3:
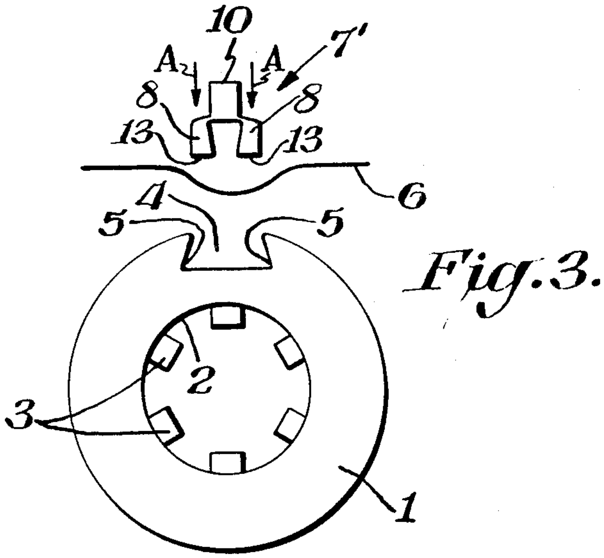
FIG. 3 is an end view in elevation of an embodiment of this invention prior to assembly and engagement thereof.
Figure 2A:
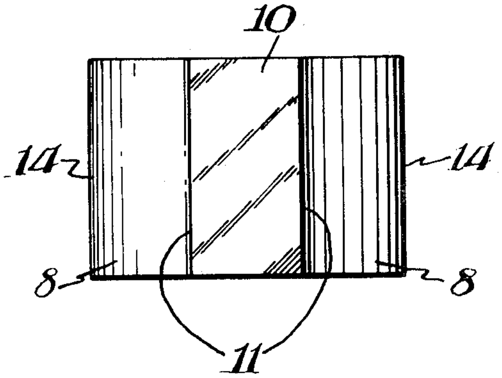
FIG. 2A is a top plan view of the preliminary assembly shown in FIG. 2.
Figure 4:
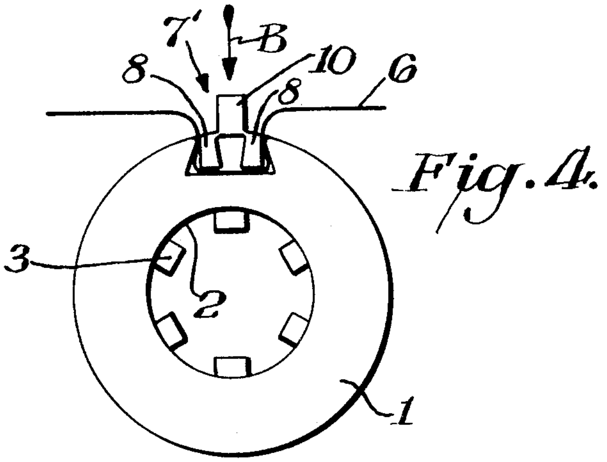
FIG. 4 is another front view in elevation of the embodiment shown in FIG. 3 in an intermediate phase of assembly and engagement.
Figure 1:
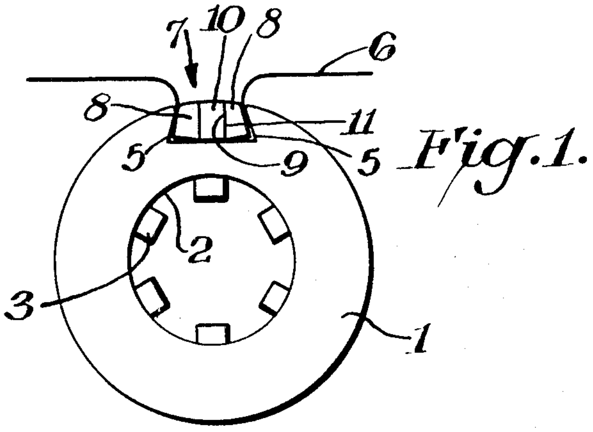
FIG. 1 is a front view in elevation of one embodiment of this invention securing a strip to the hub of a reel.

As shown in FIGS. 1, 3 and 4 a reel 1 having a central hole 2 and engaging splines 3 includes a dovetailed slot 4 having a pair of undercut corners 5 (also shown in FIG. 3).

FIG. 1 shows an engaged form of this device in which a strip 6, such as a magnetic tape, is secured within dovetailed slot 4 by inserted and engaged wedge assembly 7 including a pair of outer tapered wedges 8 engaged within undercut corners 5 with their inner surfaces 9 disposed parallel to each other and spaced apart by inner plug 10. Plug 10 is frictionally inserted between tapered wedges 8 with its parallel outer surfaces 11 forcibly contacting spaced inner parallel surfaces 9 of outer tapered wedges 8.

Figure 2:
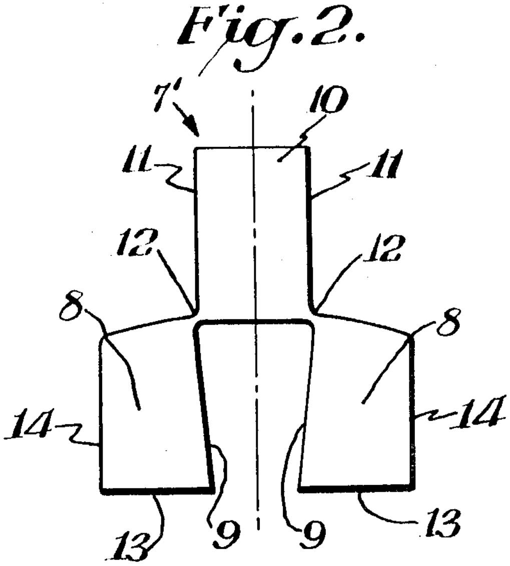
FIG. 2 is an enlarged front view in elevation of a preliminary wedge assembly for use in the embodiment of this invention shown in FIG. 1.

FIG. 2 is an enlarged view in elevation of preliminary wedge assembly 7′ in its assembled condition before insertion into dovetailed slot 4. Wedge assembly 7′ includes a pair of tapered wedges 8 and a central plug 10. The upper adjacent pair of corners of tapered wedges 8 are connected to the bottom adjacent corners of plug 10, by flexible frangible webs 12. Webs 12 are broken when the bottoms 13 of tapered wedges 8 are engaged with the floor of dovetailed slot 4 and the pushing force thereon is continued on plug 10 to sever webs 12. Tapered wedges 8 have their inner and outer surfaces 9 and 14 inclined relative to each other to cause outer surfaces 14 to lock under undercut corners 5 of slot 4 after plug 10 is inserted with its outer sides 11 between inner surfaces 9 of tapered wedges 8. This disposition of preliminary wedge assembly 7′ and webs 12 also causes the outer surfaces 14 of tapered wedges 8 to lie substantially parallel to each other.

FIG. 1, 2 and 4 show the bottom surfaces 13 of tapered wedges 8 disposed substantially perpendicular to their direction of insertion, which causes them to incline away from the base of slot 4 after insertion therein. This disposition may also be described as resulting from having the bottom outside corners of the wedges substantially right angular and the inner bottom corners acute angular.

As shown particularly in FIG. 1, dovetailed slot 4 and inserted wedge assembly 7 are symmetrical about their center lines. This provides substantially equal retaining forces securing strip 6 within dovetailed slot 4 against direction of rotation of the reel in both directions. This structure also permits strip 6 to pass completely under securing wedge assembly 7. The top outer corners of wedges 8 are obtuse angular to provide a substantially smooth continuation of the hub when they are inserted and engaged within dovetailed slot 4.

FIGS. 3 and 4 show preliminary stages of assembly and engagement of preliminary wedge assembly 7′ and the manner in which it is engaged against a strip 6 to insert it within dovetailed slot 4. FIG. 3 shows the separate elements position for engagement with each other and with tape 6 disposed between preliminary wedge assembly 7′ and dovetailed slot 4. Pressure is first exerted on the tops of tapered wedges 8 in the direction of arrows A. This inserts the parallel outer sides 14 of tapered wedges 8 past the entrance into dovetailed slot 4 until the bottom surfaces 13 of wedges 8 contact the floor of slot 6 or the portion of tape 6 disposed therebetween. The flat configuration of bottom surfaces 13 avoids any damage to the tape which they push into the slot. Plug 10 is then pressed inwardly in the direction arrow B (as shown in FIG. 4) to tear and sever thin webs 12. Continued pressure in the direction of the arrow B forces severed plug 10 between the initially inwardly tapered inner sides 9 of tapered plugs 8 to thereupon press outer surfaces 14 into undercut corners 5 of slot 4. This culminates in the assembled and engaged final wedge assembly 7 shown in FIG. 1. When tapered wedges 8 are forced outwardly, their angular configuration tilts bottom surfaces 13 away from the base of slot 4 in corners 5 so that some free space is provided between the outer corners of tapered wedges 8 and undercut corners 5 of slot 4. This avoids sharply crimping, creasing or folding of the portion of tape 6 thus loosely confined within undercut corners 5. Plug 10 remains frictionally engaged between tapered wedges 8 by the forceful contact of its parallel sides 11 between inner sides 9 of tapered wedges 8.

The above description demonstrates that this invention requires only the application of force in only one direction or two forces in close sequence in the same direction to engage and secure a strip to a reel. This invention therefore makes it possible to attach tapes or other strips to reels by automatic devices having simple and economical structure and operation.

We claim:

1. A device for attaching a flexible strip to a reel comprising a cylindrical hub on said reel, a dovetailed slot in said hub having a pair of undercut corners on both sides of a base, a pair of tapered wedges disposed within said slot adjacent said undercut corners, said strip being disposed within said slot under said tapered wedges, and a substantially rectangular plug in said slot snugly disposed between said tapered wedges whereby said tapered wedges are secured against said undercut corners and said strip is secured in said slot.

2. A device as set forth in claim 1 wherein each of said tapered wedges have one substantially right angular bottom corner disposed against said undercut corners of said slot and have an acute angular opposite bottom corner whereby said tapered wedges are securely locked between said plug and said undercut corners of said slot with reduced creasing action on said strip.

3. A device as set forth in claim 1 wherein the top corners of said tapered wedges at the edge of said slot and adjacent said plug are respectively obtuse and acute angular to provide a substantially smooth continuation of said hub for winding said strip over it.

4. A device for attaching a flexible strip to a reel with a cylindrical hub having a dovetailed slot therein, said device comprising a pair of tapered wedges for disposition within said slot, said tapered wedges having narrow tops and wide bottoms, said tapered wedges being spaced apart and disposed substantially parallel to each other, a substantially rectangular plug, said plug being disposed adjacent said spaced wedges with the corners of one of its sides being disposed adjacent the spaced corners of the narrow tops of said wedges, and frangible webs connecting adjacent corners of said plug and said wedges whereby said device is maintained assembled prior to insertion within said dovetailed slot.

5. A device as set forth in claim 4 wherein the outer sides of said wedges are disposed parallel to each other whereby insertion in said slot is facilitated.

6. A device as set forth in claim 5 wherein the bottom outside corners of said wedges are substantially right angular and the inner bottom corners of said tapered wedges are acute angular whereby insertion and locking in said dovetailed slot is facilitated.

7. A device as set forth in claim 6 wherein the top outside corners of said tapered wedges are obtuse angular to provide a substantially smooth continuation of said hub when inserted in said dovetailed slot.

8. A device as set forth in claim 4 wherein the distance across the spaced tops of said tapered wedges is substantially equal to the opening to said slot and the sum of the assembled widths of the bottoms of said tapered wedges and the adjacent side of said plug being substantially equal to the base of said slot.

9. A device as set forth in claim 4 wherein the outer sides of said tapered wedges are disposed substantially parallel to each other and the inner adjacent sides of said tapered wedges are inclined toward each other from the connected corners of said wedges to the free adjacent corners of said wedges remote from said webs.

10. A device as set forth in claim 9 wherein the outer corners of said wedges adjacent said corners connected by said webs to said plug are obtuse angular and said corners of said wedges connected by said webs are acute angular, whereby the exposed surfaces of said wedges and said plug after insertion and engagement form a substantially smooth continuation of said hub.

11. A device as set forth in claim 10 wherein the surfaces of said wedges between said obtuse and acute angular corners are slightly curved to help form said substantially smooth continuation.

12. A device as set forth in claim 11 wherein said obtuse and acute angular corners are smoothly curved to also help form said substantially smooth continuation. X

* * * * *